US006291372B1

(12) United States Patent
Mumick et al.

(10) Patent No.: US 6,291,372 B1
(45) Date of Patent: Sep. 18, 2001

(54) ION SENSITIVE BINDER FOR FIBROUS MATERIALS

(75) Inventors: Pavneet Singh Mumick, Appleton; William Seal Pomplun, Neenah, both of WI (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/480,434

(22) Filed: Jan. 11, 2000

Related U.S. Application Data

(62) Division of application No. 08/862,806, filed on May 23, 1997, now Pat. No. 6,043,317.

(51) Int. Cl.[7] .......................... B32B 27/04; B32B 27/12; B32B 5/02; D04H 1/00; D04H 13/00
(52) U.S. Cl. .......................... 442/102; 442/152; 442/164; 442/327
(58) Field of Search .................. 525/176, 330.2; 442/59, 327, 152, 102, 164; 162/184; 604/364, 358; 524/461

(56) References Cited

U.S. PATENT DOCUMENTS

| 28,957 | 9/1976 | Drelich et al. . |
|---|---|---|
| 2,265,913 | 12/1941 | Lilienfeld . |
| 2,306,451 | 12/1942 | Lilienfeld . |
| 2,831,852 | 4/1958 | Savage . |
| 3,388,082 | 6/1968 | Rodgers . |
| 3,406,688 | 10/1968 | Cubitt . |
| 3,453,261 | 7/1969 | Scherff . |
| 3,709,876 | 1/1973 | Glomski . |
| 3,800,797 | 4/1974 | Tunc . |
| 3,804,092 | 4/1974 | Tunc . |
| 3,839,319 | 10/1974 | Greminger . |
| 3,897,782 | 8/1975 | Tunc . |
| 3,926,951 | 11/1975 | Lindenfors et al. . |
| 3,939,836 | 2/1976 | Tunc . |
| 4,005,251 | 1/1977 | Tunc . |
| 4,035,540 | 7/1977 | Gander . |
| 4,073,777 | 1/1977 | O'Neill et al. . |
| 4,084,033 * | 4/1978 | Drelich ............................... 428/198 |
| 4,084,591 | 4/1978 | Takebe et al. . |
| 4,117,187 | 9/1978 | Adams et al. . |
| 4,245,744 | 1/1981 | Daniels et al. . |
| 4,258,849 | 3/1981 | Miller . |
| 4,309,469 | 1/1982 | Varona . |
| 4,343,403 | 8/1982 | Daniels et al. . |
| 4,372,447 | 2/1983 | Miller . |
| 4,419,403 | 12/1983 | Varona . |
| 4,491,645 | 1/1985 | Thompson . |
| 4,537,807 | 8/1985 | Chan et al. . |
| 4,702,947 | 10/1987 | Pall et al. . |
| 4,755,421 | 7/1988 | Manning et al. . |
| 4,855,132 | 8/1989 | Heller et al. . |
| 4,894,118 | 1/1990 | Edwards et al. . |
| 5,104,923 * | 4/1992 | Steinwand et al. ................. 524/461 |
| 5,300,192 * | 4/1994 | Hansen et al. ....................... 162/184 |
| 5,312,883 | 5/1994 | Komatsu et al. . |

(List continued on next page.)

FOREIGN PATENT DOCUMENTS

| 1 719 395 | 12/1970 | (DE) . |
|---|---|---|
| 0 303 528 | 2/1989 | (EP) . |
| 0 601 518 | 6/1994 | (EP) . |
| 0 608 460 | 8/1994 | (EP) . |
| 0 726 068 | 8/1996 | (EP) . |
| 0 807 704 | 11/1997 | (EP) . |
| 6-172453 | 6/1994 | (JP) . |
| 08-239428 | 9/1996 | (JP) . |
| 96/12615 | 5/1996 | (WO) . |

OTHER PUBLICATIONS

D 5034–11, "Standard Test Method for Breaking Force and Enlongation of Textile Fabrics (Grab Test)," 1994 Annual Book of ASTM Standards 7.02 pp. 708–9 1994.

Derwent WPI, JP 5–179548 (Lion Corp. 1993) Jul. 20, 1993.

Derwent WPI and JAPIO, JP 03–239709 (Lion Corp) Oct. 25, 1991, abstract 1991.

Carlsson et al. Thermal Gelation of Nonionic Cellulose Ethers and Ionic Surfactants in Water Colloids and Surfaces 47 147–165 1990.

Derwent WPI, JP 1–306661 (Lion Corp. 1989) Dec. 11, 1989.

Chowdhury et al. Direct Observation of the Gelatin of Rodlike Polymers Polymeric Materials Science and Engineering 59 1045–1052 1988.

Derwent WPI and JAPIO, JP 63–139906 (Lion Corp) Jun. 11, 1988, abstract 1988.

Nagura et al. Temperature–Viscosity Relationships of Aqueous Solutions of Cellulose Ethers Kobunshi Ronbunshu 38(3) 133–137 1980.

Stafford et al. Temperature dependence of the distintegration times of compressed tablets containing hydroxyproplcellulose as binder J. Pharm. Pharmac 30 1–5 1977.

*Primary Examiner*—Blaine Copenheaver
*Assistant Examiner*—Christopher C. Pratt
(74) *Attorney, Agent, or Firm*—Kilpatrick Stockton, LLP

(57) ABSTRACT

A water soluble polymer binder for binding a fibrous substrate comprises from about 25 weight percent to about 85 weight percent of an unsaturated carboxylic acid/unsaturated carboxylic acid ester terpolymer; from about 5 weight percent to about 35 weight percent of a divalent ion inhibitor; and from about 10 weight percent to about 60 weight percent of a hydrophilic cross-linkable polymer. In a preferred mode of the invention the hydrophilic cross-linkable polymer functions substantially as a divalent ion inhibitor and promotes hydrophilicity of the treated fabric eliminating the requirement of a separate divalent ion inhibitor. The binder composition is soluble in an aqueous environment having a divalent ion concentration less than about 50 ppm and a monovalent ion concentration of less than about 0.4 weight percent. Also disclosed is a water dispersible fibrous fabric having an effective amount of the binder distributed on the fibrous substrate and a method of making a water dispersible fibrous fabric.

16 Claims, No Drawings

U.S. PATENT DOCUMENTS

| | | | |
|---|---|---|---|
| 5,317,063 | * 5/1994 | Komatsu et al. | 525/330.2 |
| 5,360,826 | 11/1994 | Egolf et al. . | |
| 5,384,189 | * 1/1995 | Kuroda et al. | 428/288 |
| 5,500,281 | 3/1996 | Srinivasan et al. . | |
| 5,509,913 | * 4/1996 | Yeo | 604/364 |
| 5,631,317 | 5/1997 | Komatsu et al. . | |
| 5,770,528 | 6/1998 | Mumick et al. . | |
| 6,043,317 | 3/2000 | Mumick et al. . | |

* cited by examiner

ION SENSITIVE BINDER FOR FIBROUS MATERIALS

CROSS-REFERENCE TO RELATED APPLICATIONS

This application is a divisional application of U.S. patent application Ser. No. 08/862,806, filed on May 23, 1997, now U.S. Pat. No. 6,043,317.

BACKGROUND OF THE INVENTION

The present invention relates to a water dispersible material whose solubility in water is dependent upon the total ionic concentration in the water and particularly the concentration of divalent ions. More particularly, the invention relates to a polymer binder composition that is dispersible in water when the concentration of divalent ions in the water is less than about 50 parts per million (ppm) and desirably, the concentration of monovalent ions is less than about 0.4 weight percent. Advantageously, the polymer composition is insoluble in an aqueous solution having a concentration of divalent ions greater than about 50 ppm. The invention is further directed to a method of making a water dispersible nonwoven fibrous fabric comprising a fibrous substrate and the ion sensitive binder composition distributed therein and the water dispersible nonwoven fibrous fabric utility in water-dispersible personal care products.

While the composition and products of the present invention are described herein primarily in connection with advantageous applications as a disposable absorbent article and more particularly, a premoistened wipe, it should be understood that the present invention is not limited thereto. In light of the present disclosure, those skilled in the art will recognize a variety of applications in other fields where flushability of a fibrous fabric would be desirable.

Nonwoven fibrous fabrics and webs are widely used as components of disposable products as sanitary napkins, diapers, wound dressings, bandages, nursing pads, and premoistened wipes. The terms "nonwoven fibrous webs", "fibrous webs", "nonwoven fabrics", "fabrics" and "fibrous substrates" are interchangeably used herein and include, without limitation, methods of making such fabrics and webs which can include, but are not limited to, air-laying and wet laying.

Such fabrics, if they are to function effectively, must maintain their structural integrity as well as exhibit satisfactory tensile strength when they are damp or wet. However, it has been recognized that if such nonwoven fabrics were to lose substantially all of their tensile strength when exposed to water and become readily dispersible therein, disposal problems would be substantially eliminated. The products could be easily and conveniently flushed down a conventional toilet or water closet.

Desirably, the fabrics possess a number of characteristics such as softness and flexibility. The fabric is usually formed by wet or dry laying random fibers and joining them together to form a coherent web. In an attempt to provide a nonwoven fabric with specific in-use characteristics, prior methods have rendered the fabric non-dispersible in water. For example, nonwovens have been bonded with fluid-insoluble resins which impart in-use strength. However, such resins impede flushing and dispersal of the fabric by rendering the fabric substantially water insoluble.

With regard to premoistened wipes, special problems arise. The wipes, which are used for skin cleansing and are known commercially as towelettes, wet wipes or fem-wipes, are formed from paper or nonwoven fibrous webs treated with a polymeric binder. The binder imparts to the web a degree of wet strength so that the web will not lose its tensile strength while being stored in an appropriate liquid medium. However, after the wipe has been used, the binder should be readily weakened when exposed to an aqueous environment, such as when the wipe is disposed of in a toilet, without clogging the toilet and plumbing.

In an attempt to impart dispersibility in water, various binders have been used in the manufacture of the wipe. For example, wipes have included as a binder an acid-insoluble, alkali-soluble polymeric polycarboxylic acid and functional derivatives thereof wherein the acid is placed in water and enough alkali is added to substantially neutralize all acidic groups prior to applying the binder to the web. The binder-saturated web is dried and then immersed in a low pH medium where it retains its structural integrity yet will still break up when the wipe is immersed in a sufficiently high pH liquid medium.

Another binder used has been polyvinyl alcohol combined with a gelling or insolubilizing agent such as borax. The borax cross-links at least the surface of the polymer binder before the web is dried to give a water resistant web. Such cross-links are reversible, that is, when the concentration of borax is reduced below a certain level, the degree of cross-linking is so low that the binder becomes soluble in water.

A problem with the above binders is that to prevent the nonwoven fibrous fabric from disintegrating prior to disposal, the wipe must be maintained in a solution having a pH which may cause irritation to the skin when the wipe is used.

Another binder that is, to a limited degree, water soluble comprises an unsaturated carboxylic acid/unsaturated carboxylic acid ester copolymer. The web is water soluble, water dispersible or water disintegratable in an aqueous environment, provided the water is predominantly void of divalent ions. However, in those areas where the water is "moderately hard", because the water contains divalent ions such as calcium ions and/or magnesium ions, the wipes do not readily disperse. The water soluble polymeric binder is substantially rendered insoluble by the presence of these divalent ions. Although not wanting to be held to any particular theory, it is believed that the divalent ions irreversibly cross-link the binder, preventing it from dispersing in water. Until now, it has not been recognized the adverse effect that divalent ions present in the aqueous environment has on the water solubility of the polymeric binder.

A problem with the aforementioned binder is that they require a relatively long contact time for the storage solution to wet the fibrous fabric during the high speed converting process. Such times may be as long as several hours. This limits the commercial utility of the binder for use in a moistened wipe.

Another problem with the aforementioned binder is that it does not have sufficient end use strength for use as a wiper.

Accordingly, there is a need for a water soluble binder composition that can be used in an article, such as a wipe, that is safe to use and will be substantially unaffected by the presence of divalent ions normally found in moderately hard water.

SUMMARY OF THE INVENTION

Briefly, the present invention relates to a water soluble polymeric binder composition that can be used in a non-woven fibrous web, fabric, or substrate. The water soluble polymeric binder composition includes an unsaturated carboxylic acid/unsaturated carboxylic acid esters terpolymer, a divalent ion inhibitor and a hydrophilic cross-linkable polymer. In a preferred embodiment the hydrophilic cross-linkable polymer can function as the divalent ion inhibitor and be substituted therefore. The water soluble polymeric binder composition comprises from about 25 weight percent to about 85 weight percent of an unsaturated carboxylic acid/unsaturated carboxylic acid esters terpolymer; from about 5 weight percent to about 35 weight percent of a divalent ion inhibitor; and from about 10 weight percent to about 60 weight percent of a hydrophilic cross-linkable polymer. As used herein "divalent ion inhibitor" means any substance which inhibits the irreversible cross-linking of the neutralized acrylic acid units in the base terpolymer by the divalent ions. In a preferred embodiment of the invention the hydrophilic cross-linkable polymer functions substantially as a divalent ion inhibitor so that the binder composition comprises from about 25 weight percent to about 85 weight percent of an unsaturated carboxylic acid/unsaturated carboxylic acid esters terpolymer and from about 15 weight percent to about 75 weight percent of the hydrophilic cross-linkable polymer.

Advantageously, the binder composition of the invention is soluble in an aqueous environment having a divalent ion concentration less than about 50 ppm and a monovalent concentration of less than about 0.4 weight percent.

Another aspect of the invention is a nonwoven fibrous fabric that is water dispersible. The nonwoven fabric includes a fibrous substrate and the water soluble binder distributed through the fibrous substrate for binding together the fibrous material of the fabric. The nonwoven fibrous fabric is water dispersible in an aqueous environment having a divalent ion concentration of less than about 50 ppm and a monovalent ion concentration of less than about 0.4 weight percent.

Another aspect of the invention is a method of making a water dispersible nonwoven fibrous fabric. The method includes the steps of contacting a fibrous substrate with an effective amount of the water soluble binder composition above so as to bind a substantial amount of the fibers and drying the fabric.

It is an object of the invention to provide a water soluble polymer which is soluble in soft to moderately hard water but will be insoluble in water having concentrations of divalent ions greater than about 50 ppm. As used herein "moderately hard" water means water which possesses a total concentration of from about 25 ppm to about 50 ppm of divalent ions. Non-limiting examples of divalent ions include calcium and/or magnesium ions. As used herein, soft water has a concentration of divalent ions of less than about 25 ppm and very hard water has a concentration of divalent ions of more than about 50 ppm.

It is another object of the invention to provide a nonwoven fabric that is water dispersible in soft to moderately hard water having a concentration of divalent ions of less than about 50 ppm.

Another object of the invention is to provide a premoistened wipe that is easily dispersible in soft to moderately hard water.

It is another object of the invention to provide a wipe that can be disposed of in standard sewer or septic systems that is water dispersible and will not clog the water closet or plumbing.

DESCRIPTION OF THE PREFERRED EMBODIMENTS

The nonwoven fabrics prepared in accordance with this invention have good dry tensile strength depending upon, among other things, the amount of binder applied to the fabric and the manner in which it is applied. The nonwoven fabric is abrasion resistant and retains significant tensile strength in aqueous solutions containing greater than about 50 ppm divalent ions. Yet the nonwoven fabric is dispersible in soft to moderately hard water. Because of this latter property, nonwoven fabrics of the invention are well suited for disposable products such as sanitary napkins, diapers, and dry and premoistened wipes which can be thrown in a flush toilet after use.

The binder of the present invention provides for the breaking up of the wipe after flushing because, in tap water, the binder lessens and preferably loses the bonding strength between the binder and the fibers. However, the binder has substantial cohesive strength to hold the nonwoven fabric together during the shelf life period and during its use. In accordance with one embodiment of the invention, the water-soluble binder composition comprises from about 25 weight percent to about 85 weight percent of the unsaturated carboxylic acid/unsaturated carboxylic acid esters terpolymer; from about 5 weight percent to about 35 weight percent of a divalent ion inhibitor; and from about 10 weight percent to about 70 weight percent of the hydrophilic cross-linkable polymer. Desirably, the water-soluble binder composition comprises from about 40 weight percent to about 75 weight percent of the unsaturated carboxylic acid/unsaturated carboxylic acid esters terpolymer, from about 5 weight percent to about 20 weight percent of the divalent ion inhibitor and from about 10 weight percent to about 50 weight percent of the hydrophilic cross-linkable polymer.

In a preferred embodiment of the invention the hydrophilic cross-linkable polymer functions substantially as a divalent ion inhibitor thereby eliminating the use of a separate divalent ion inhibitor. Advantageously the hydrophilic crosslinkable polymer promotes hydrophilicity of the treated fabric. Accordingly, the water-soluble binder composition comprises from about 25 weight percent to about 85 weight percent of unsaturated carboxylic acid/unsaturated carboxylic acid esters terpolymer and from about 15 weight percent to about 75 weight percent of a hydrophilic cross-linkable polymer. Desirably, the water-soluble binder comprises from about 40 weight percent to about 75 weight percent of the unsaturated carboxylic acid/unsaturated carboxylic acid esters terpolymer and from about 25 weight percent to about 60 weight percent of the hydrophilic cross-linkable polymer.

Advantageously, the binder composition of the invention is water soluble in an aqueous environment having a divalent ion concentration less than about 50 ppm and a monovalent ion concentration of less than about 0.4 weight percent.

Although conventional unsaturated carboxylic acids can be used as a monomer component of the terpolymers, acrylic acid and/or methacrylic acid are preferable. Examples of the unsaturated carboxylic acid ester monomer components include acrylic esters and/or methacrylic esters having an alkyl group of 1 to 18 carbon atoms or a cycloalkyl group of 3 to 18 carbon atoms and it is preferable that acrylic esters and/or methacrylic esters having an alkyl group of 1 to 12 carbon atoms or a cycloalkyl group of 3 to 12 carbon atoms be used singly or in combination.

More specifically, examples of the terpolymers include copolymers of 10 weight percent to 90 weight percent, preferably 20 weight percent to 70 weight percent of acrylic acid and/or methacrylic acid and 90 weight percent to 10 weight percent, preferably 80 weight percent to 30 weight percent of acrylic esters and/or methacrylic esters having an alkyl group of 1 to 18 carbon atoms or a cycloalkyl group of 3 to 18 carbon atoms in which 1 to 60 mole percent, preferably 5 to 50 mole percent of acrylic acid and/or methacrylic acid is neutralized to form a salt; or copolymers of 30 weight percent to 75 weight percent, preferably 40 weight percent to 65 weight percent of acrylic acid, 5 weight percent to 30 weight percent, preferably 10 weight percent to 25 weight percent of acrylic esters and/or methacrylic esters having an alkyl group of 8 to 12 carbon atoms and 20 weight percent to 40 weight percent ; preferably 25 weight percent to 35 weight percent of acrylic esters and/or methacrylic esters having an alkyl group of 2 to 4 carbon atoms in which 1 to 50 mole percent, preferably 2 to 40 mole percent of acrylic acid is neutralized to form a salt. The molecular weight of the terpolymers are not particularly limited, although the weight-average molecular weight of the terpolymers is preferably 5,000 to 1,000,000, more preferably 30,000 to 500,000.

Any inorganic base or organic base can be optionally used as a neutralizing agent to neutralize the unsaturated carboxylic acid component of the copolymers. Examples of the neutralizing agents include inorganic bases such as sodium hydroxide, potassium hydroxide, lithium hydroxide and sodium carbonate, and amines such as monoethanolamine, diethanolamine, diethylaminoethanol, ammonia, trimethylamine, triethylamine, tripropylamine, morpholine. Preferred are ethanolamines or sodium hydroxide or a combination of potassium hydroxide and ethanolamines. Unsaturated carboxylic acid/unsaturated carboxylic acid ester copolymers are disclosed in U.S. Pat. No. 5,384,189 entitled "WATER-DECOMPOSABLE NON-WOVEN FABRIC" entire disclosure of which is incorporated herein by reference and made a part hereof. The terpolymer is available from the LION Corporation, Tokyo Japan.

Divalent ion inhibitors useful in the invention include sulfonated copolyesters such as EASTMAN AQ 29D, AQ 38D and AQ 55D (available from Eastman Chemicals, Kingsport, Tenn.); L9158 (available from ATO Findley); cross-linkable poly(ethylene-vinyl acetate) (available from National Starch and Chemical Company, Bridgewater, N.J. under the tradename ELITE-33); polyphosphates such as sodium tripolyphosphate, phosphonic acids such as ethylene diaminetetra(methylenephosphonic acid), aminocarboxylic acids such as ethylenediaminetetraacetic acid and nitrilotriacetic acid, hydroxycarboxylic acids such as citric acid; and polyamines such as porphozins.

Hydrophilic cross-linkable polymers suitable for use in the invention, include polymers having one or more hydrophilic monomers and monomer that are capable of cross-linking. Non-limiting examples of such polymers include: 1) poly(ethylene-vinyl acetate) with N-substituted acrylamide such as N-methylol acrylamide; 2) acrylamide and N-substituted acrylamide based copolymers with a cross-linkable monomer such as N-methylol acrylamide; 3) copolyacrylates such as hydroxy ethyl methacrylate or poly (ethylene glycol)-methacrylate (PEG-MA) with methyl methacrylate or methyl acrylate; 4) poly(ethylene vinyl alcohol) having less than about 3 percent hydrolysis; and 5) poly(ethylene glycol) grafted onto other polymers such as polyolefins so that the poly(ethylene glycol) moieties can be cross-linked. A preferred cross-linkable polymer is poly (ethylene-vinyl acetate) with N-methylol acrylamide available from National Starch and Chemical Company, Bridgewater, N.J. under the tradename ELITE-33.

In another embodiment of the invention, the binder formulations of the present invention can be applied to any fibrous substrate to form a water dispersible fibrous fabric.

The water dispersible fibrous fabric of the invention is soluble, i.e. disintegratable or dispersible, in an aqueous environment having a divalent ion concentration less than about 50 ppm and a monovalent ion concentration of less than about 0.4 weight percent. The water dispersible fabric of the invention is particularly suitable for use in a water-dispersible product. Suitable fibrous substrates include, but are not limited to, nonwoven and woven fabrics. In many embodiments, particularly personal care products, preferred substrates are nonwoven fabrics due to their absorptivity of fluids such as blood, menses and urine. As used herein "nonwoven fabric" refers to a fabric that has a structure of individual fibers or filaments randomly arranged that may be bonded together in a mat-like fashion. Nonwoven fabrics can be made from a variety of processes including, but not limited to, air-laid process, wet-laid processes, hydroentangling processes, staple fiber carding, bonding and solution spinning.

The binder formulations are particularly useful for binding fibers of air-laid nonwoven fabrics. These air-laid materials are particularly useful for body-side liners, fluid distribution materials, fluid in-take materials, such as a surge material, absorbent wrap sheet and cover stock for various water-dispersible personal care products. Air-laid materials are particularly useful for use as a premoistened wipe. The basis weights for these air-laid non-woven fabrics win range from about 20 to about 200 grams per square meter (gsm) with staple fibers having a 2–3 denier and a length of about 6–15 millimeters. Surge or in-take materials need better resiliency and higher loft so staple fibers having about 6 denier or greater are used to make these products. A desirable final density for the surge or in-take materials is between about 0.025 grams per cubic centimeter (gtcc) to about 0.050 g/cc. Fluid distribution materials will have a higher density, in the desired range of about 0.10 to about 0.20 g/cc using fibers of lower denier, most desirable fibers have a denier of less than about 1.5. Wipers generally, have a density of about 0.05 g/cc to about 0.1 g/cc and a basis weight of about 60 gsm to about 90 gsm.

The nonwoven fabric itself can be formed of natural fibers, synthetic fibers and combinations thereof The choice of the fibers depends upon, for example, fiber cost and the intended end use of the finished fabric. Non-limiting examples of suitable fibers, which can be used alone or in combination to form the substrates, include cotton, linen, jute, hemp, wool, wood pulp, regenerated cellulosic fibers such as viscose rayon, modified cellulosic fibers such as cellulose acetate, or synthetic fibers derived from polyvinyl alcohol, polyesters, polyamides, polyacrylics, etc. Blends of one or more of the above fibers may also be used if so desired.

For wipers, the nonwoven fabric is, desirably, formed from relatively short fibers, such as wood pulp fibers. The minimum length of the fibers depends on the method selected for forming the nonwoven fabric. Where the, nonwoven fabric is formed by the wet or dry method the fiber length is desirably from about 0.1 millimeters to 15 millimeters. It has been determined that when a substantial quantity of fibers having a length greater than about 15 millimeters is placed in a flushable fabric their length tends to form ropes of fibers which are undesirable in a flushable material. Desirably, the nonwoven fabric of the invention has a relatively low wet cohesive strength when they are not bonded together by an adhesive or binder material. When such nonwoven fabrics are bonded together by an adhesive which loses its bonding strength in tap water and in sewer water, the fabric will break up readily by the agitation provided by flushing and moving through the sewer pipes.

The nonwoven fabric of the present invention may be formed from a single layer or multiple layers. In the case of multiple layers, the layers are generally positioned in a juxtaposed or surface-to-surface relationship and all or a portion of the layers may be bound to adjacent layers. The nonwoven fabric may also be formed from a plurality of separate nonwoven fabrics wherein the separate nonwoven fabrics may be formed from a single or multiple layers. The binder may be distributed on the nonwoven fabric as a single application or where there are multiple layers, each individual layer may be separately subjected to a binder application and then combined with other layers in a juxtaposed relationship to form the finished nonwoven fabric.

The binder composition may be applied to the nonwoven fabric by any known process of application. The binder can be applied to the nonwoven fabric by, for example, spraying, dipping, printing, coating, or any other technique. When the binder is applied to the nonwoven fabric so as to retain the integrity of the fabric, it is necessary to uniformly disperse the binder in substantially all of the fabric so as to cover substantially all of the fiber junctions. Desirably, the binder is dispersed in the nonwoven fabric so that from about 80 percent to 100 percent of the fiber junctions are covered by the binder. More desirably, the binder is dispersed in the nonwoven fabric so that from about 95 percent to 100 percent of the fiber junctions are covered by the binder.

Another embodiment of the invention is a method of making a water dispersible nonwoven fabric. The method includes the steps of contacting the fibrous substrate with an effective amount of the binder formulations of the present invention so as to bind a substantial amount of the fibers. The nonwoven fabric is then dried to form a water dispersible fibrous fabric. For ease of applying the binder to the nonwoven fabric, the binder may be emulsified, dispersed and/or dissolved in water or a solvent such as methanol, ethanol, or the like, with water being the preferred carrier. The binder can have from about 1 weight percent to about 30 weight percent solids and more desirably, from about 2.5 weight percent to about 20 weight percent solids.

Based on the weight of the fabric, the binder may be distributed or "added on" to the nonwoven fabric in an amount of from about 1 weight percent to about 50 weight percent, desirably, from about 5 weight percent to about 30 weight percent and more desirably, from about 8 weight percent to about 25 weight percent. Where the amount of the binder is less than the amount mentioned above, the resulting nonwoven fabric has insufficient mechanical strength. Alternatively, where the amount of the binder is more than the amount mentioned above, the resulting non-woven fabric does not have high softness and good touch.

The binder composition can contain plasticizers such as: glycerol; sorbitol; emulsified mineral oil; benzoate esters; polyglycols such as, polyethylene glycol polypropylene glycol and copolymers thereof; decanoyl-N-methylglucamide; tributyl citrate; and tributoxyethyl phosphate added to the solution containing the binder composition but this is not preferred. The amount of plasticizer varies according to the desired softness of the nonwoven fabric but generally can be added in an amount of from 0 weight percent to about 10 weight percent based on the weight of the fabric.

Perfumes, colorants, antifoams, bactericides, bacteriostats, surface active agents, thickening agents, fillers, as well as other water-soluble binders such as polyvinyl alcohol, aqueous dispersions of, for example, polyvinyl chloride, polyacrylates, polymethacrylates, copolymers of acrylates and methacrylates, polymers of acrylic acid, methacrylic acid or a salt thereof and carboxymethylcellulose may also be incorporated into the binder if desired.

Once the binder composition is applied to the fabric, the fabric is dried by any conventional means such as by using through air drying ovens. Once dry, the coherent fibrous fabric exhibits improved tensile strength when compared to the tensile strength of a similar but untreated wet-laid or dry-laid fabric. For example, the tensile strength of the fabric may be increased by at least 25 percent compared to the tensile strength of the untreated fabric. More particularly, the tensile strength of the fabric may be increased by at least about 100 percent and even more particularly the tensile strength of the fabric may be increased by at least about 500 percent as compared to an untreated fabric. However, and quite advantageously, the fabric will disintegrate or is disintegratable when placed in soft to moderately hard cold water and agitated. As used herein "disintegrate", "disintegratable" and "water dispersible" are used interchangeably to describe the breaking up or separating into multiple parts where the fabric, after about 90 minutes in tap water, separates into multiple pieces. Each piece of the fabric having an average size of less than about 50 percent, desirably less than about 40 percent, and more desirably less than about 30 percent, relative to the pre-dispersed size. Desirably, the fabric will disintegrate after about 60 minutes and more desirably, after about 30 minutes.

A nonwoven fabric suitable for conversion into a wipe or any other disposable product described above may be any of the type employed for such article. The finished wipes may be individually packaged, preferably in a folded condition, in a moisture proof envelope or packaged in containers holding any desired number of prefolded sheets and stacked in a water-tight package with a wetting agent applied to the wipe. The moistened wipe can contain a wetting agent. Relative to the weight of the dry fabric, the wipe may contain from about 10 percent to about 400 percent and desirably from about 100 percent to about 300 percent of the wetting agent. The wipe must maintain its desired characteristics over the time periods involved in warehousing, transportation, retail display and storage by the consumer. Accordingly, shelf life may range from two months to two years.

Various forms of impermeable envelopes for containing wet-packaged materials such as wipes and towelettes and the like are well known in the art. Any of these may be employed in packaging the premoistened wipes of the present invention.

The nonwoven fabric of the present invention can be incorporated into such body fluid absorbing products as sanitary napkins, diapers, surgical dressings, tissues and the like. The binder is such that it is not dissolved when contacted by such body fluids since the concentration of divalent ions in the fluids is above the level of dissolution. The nonwoven fabric retains its structure, softness and exhibits a toughness satisfactory for practical use. However, when brought into contact with water having a concentration of divalent ions of up to about 50 ppm the binder is dispersed. The nonwoven fabric structure is then easily broken and dispersed in the water.

The present invention will be illustrated by the following examples, which are not to be interpreted in any way as imposing limitations upon the scope of the invention described herein.

COMPARATIVE EXAMPLE 1

A binder solution was formulated having 52.6 weight percent of an unsaturated carboxylic acid/unsaturated carboxylic acid esters terpolymer (available from LION Corporation, Tokyo, Japan under the tradename SSB-3b); 42.8 weight percent of Code L9158 (available from ATO Findley, Wauwatosa, Wis.) as a divalent ion inhibiting agent; and 4.6 weight percent of a non-crystallizing grade of Sorbitol (available from Pfizer) as a plasticizer was prepared by dissolving the resin in water to yield a solution containing about 13 weight percent solids.

Twenty to about twenty-five weight percent, based on the dry weight of the nonwoven substrate, of the above formulation was sprayed on one side of a wet-laid, non-woven fibrous substrate containing 60 weight percent polyethylene terephthalate (PET) staple fibers and 40 weight percent Abaca pulp fiber (available from Hanson & Orth, Wilmington N.C.). The resulting fabric was then dried in a forced air-oven at 105° C. (221° F.) for 10 minutes. The fabric was immersed for two minutes in a small dish having 50 milliliters of a test solution having a concentration of divalent ions ($Ca^{++}$) of 100 ppm. The fabric was stable in the test solution but was found to be dispersible in cold tap water after about 15 minutes.

The tensile strength of the above saturated fabric was determined by a modified ASTM-D5034-11 (1994) test procedure. The saturated fabric had a width dimension of 25.4 millimeters and a length dimension of 152 millimeters. The procedure was modified to use a Sintech tensile tester with a jaw gap of 100 millimeters and a cross-head separation speed of 30.5 centimeters per minute. The tensile strength of the saturated fabric in the-machine direction oM) was 90 grams per 25.4 milimeters width.

EXAMPLE 1

A binder solution in accordance with the invent ion was formulated (Formulation 1) containing 50 weight percent of an unsaturated carboxylic acid/unsaturated carboxyic acid esters terpolymer (available from LION under the tradename SSB-3b); 25 weight percent of a divalent ion inhibitor (available from Eastman Chemical under the tradename AQ-29D); and 25 weight percent of a cross-linkable poly (ethylene-vinyl acetate) (available National Starch and Chemical Company, Bridgewater, N.J. under the tradename of ELITE-33). The formulation was diluted to 13 weight percent total solids. Twenty to about twenty-five weight percent, based on the dry weight of the nonwoven substrate, of the formulation was sprayed on one side onto the wet laid substrate described in Comparative Example 1. The resulting fabric was dried in a forced air-oven at 105° C. (221° F.) for 10 minutes. The fabric was immersed for two minutes in a small dish having 50 milliliters of a test solution having a concentration of divalent ions ($Ca^{++}$) of 100 ppm.

Using the procedure above for Comparative Example 1, the tensile strength of the saturated fabric was determined to be 280 grams per 25.4 millimeters width. The fabric was stable in the test solution but dispersed in water after about 50 minutes.

COMPARATIVE EXAMPLE 2

The binder formulation of Comparative Example 1 was diluted using deionized water for a total solids content of 5.9 weight percent. Twenty weight percent, based on the dry weight of the nonwoven substrate, of this binder formulation was sprayed onto both sides of a non-woven fibrous substrate containing Weyerhaueser CF 405 pulp. The resulting fabric had an overall basis weight of 68 gsm. The fabric was then dried at an oven set temperature of 400° F. for 10 to 15 seconds. Added to the fabric was 185 weight percent, based on the dry weight of the fabric, of an aqueous solution having 100 ppm divalent calcium ions.

The tensile strength of the saturated fabric was determined following ASTM-D5034-11 (1994) test procedures. The saturated fabric had a width dimension of 76 millimeters and a length dimension of 152 millimeters. The saturated fabric was placed in a Thwing-Albert tensile tester. The tensile strength of the saturated fabric in the cross-machine direction (CD) was 185 grams per 76 millimeters of width. The fabric was stable in the test solution but dispersed in water in about 10 minutes.

The wetability of the dry fabric was determined in the following manner: A drop of deionized water was deposited on to the dry fabric in eight random locations using a 10 cc syringe with an 18 gauge needle. The time for the drop of water to penetrate the fabric was recorded with the wetability of the fabric being a time average of the eight recorded times. It took 3 minutes and 5 seconds for the dry fabric to absorb the drop of deionized water.

COMPARATIVE EXAMPLE 3

The binder formulation of Comparative Example 1 was diluted using deionized water for a total solids content of 5.9 weight percent. Twenty weight percent, based on the dry weight of the nonwoven substrate, of this binder formulation was sprayed onto both sides of a non-woven fibrous substrate containing Weyerhaueser CF 405 pulp. The resulting fabric had an overall basis weight of 71 gsm The resulting fabric was then dried at an oven set temperature of 400° F. for 10 to 15 seconds. Added to the fabric was 186 weight percent, based on the dry weight of the fabric, of an aqueous solution having 100 ppm divalent calcium ions.

As determined according to the procedure of Comparative Example 2, the tensile strength of the saturated fabric was 225 grams per 76 millimeters of width. The fabric was stable in the test solution but dispersed in water in about 10 minutes.

EXAMPLE 2

A second binder solution in accordance with the invention was formulated (Formulation 2) containing 65.0 weight percent LION SSB-3b; and 35.0 weight percent ELITE-33. The formulation was diluted to 15.0 weight percent total solids. About 25 weight percent based on dry weight of the nonwoven substrate, of formulation 2 was applied to a nonwoven fibrous substrate containing Weyerhaueser CF 405 pulp. The resulting fabric had an overall basis weight of 69 gsm. The fabric was dried at an oven set temperature of 380° F. for 10–15 seconds. Added to the fabric was 250 weight percent, based on dry weight of the fabric, of an aqueous solution having 100 ppm divalent calcium ions.

As determined according to the procedure of Comparative Example 2, the tensile strength of the saturated fabric was 700 grams per 76 millimeters of width. The fabric was stable in the test solution but dispersed in water in less than 60 minutes.

As determined by the wetability procedure of Comparative Example 2, it took one minute and eight seconds on average for the dry fabric to absorb the drop of deionized water.

EXAMPLE 3

Another binder solution in accordance with the invention was formulated (Formulation 3) containing 65.0 weight percent LION SSB-3b; 22.5 weight percent ELITE-33; and 12.5 weight percent of AQ-29D (divalent ion inhibitor). The formulation was diluted to 15.5 weight percent total solids. About 25 weight percent based on dry weight of the non-woven substrate, of formulation 3 was applied to a non-woven fibrous substrate containing Weyerhaeuser CF 405 pulp. The resulting fabric had an overall basis weight of 72 gsm. The fabric was dried at 380° F. for 10–15 seconds. Added to the fabric was 250 weight percent, based on dry weight of the fabric, of an aqueous solution having 100 ppm divalent calcium ions.

As determined according to the procedure of Comparative Example 2, the tensile strength of the saturated fabric was 621 grams per 76 millimeters of width. The fabric was stable in the test solution but dispersed in water in less than 15 minutes.

As determined by the wetability procedure of Comparative Example 2, it took less than ten seconds on average for the dry fabric to absorb the drop of deionized water.

EXAMPLE 4

Another binder solution in accordance with the invention was formulated (Formulation 4) containing 39.5 weight percent LION SSB-3b; 32.1 weight percent of a divalent ion inhibitor (L-9158 available from ATO Findley); 25 weight percent of poly(ethylene-vinyl acetate) (ELITE-33); and 3.4 weight percent sorbitol as a plasticizer. The formulation was diluted using deionized water to 7.8 weight percent total solids. About 20 weight percent, based on the dry weight of the nonwoven substrate, of formulation 4 was applied to a non-woven fibrous substrate containing Weyerhaueser CF 405 pulp. The resulting fabric had an overall basis weight of 66 gsm. The fabric was then dried and at an oven set temperature of 440° F. for 10–15 seconds. Added to the fabric was 186 weight percent, based on the dry weight of the fabric, of an aqueous solution having 100 ppm divalent calcium ions.

As determined according to the procedure of Comparative Example 2, the tensile strength of the saturated fabric was 587 grams per 76 millimeters of width. The fabric did not disperse in water due to excessive heat curing cross-linking of the polymers at the high drying temperature.

As determined by the procedure of Comparative Example 2, it took two minutes and 17 seconds on average for the dry fabric to absorb the drop of deionized water.

EXAMPLE 5

The procedure of Example 4 above was repeated with the following noted exceptions. Added to the fabric was 173 weight percent, based on the dry weight of the fabric, of an aqueous solution having 100 ppm divalent calcium ions.

As determined according to the procedure of Comparative Example 2, the tensile strength of the saturated fabric was 652 grams per 76 millimeters of width. The fabric did not disperse in water due to excessive heat curing cross-linking of the polymers at the high drying temperature.

EXAMPLE 6

About 15 weight percent, based on the dry weight of the nonwoven substrate, of formulation 4 was sprayed on both sides of the substrate. The resulting fabric had an overall basis weight of 68 gsm. The fabric was then dried and at 400° F. for 10–15 seconds. Added to the fabric was 226 weight percent, based on the dry weight of the fabric, of an aqueous solution having 100 ppm divalent calcium ions.

As determined according to the procedure of Comparative Example 2, the tensile strength of the saturated fabric was 660 grams per 76 millimeters of width. The fabric was stable in the test solution but dispersed in water in less than one hour.

As determined by the procedure of Comparative Example 2, it took one minute and 52 seconds on average for the dry fabric to absorb the drop of deionized water.

EXAMPLE 7

The procedure of Example 4 above was repeated with the following noted exceptions. About 10 weight percent, based on the dry weight of the nonwoven substrate, of Formulation 4 was sprayed on both sides of the substrate. The resulting fabric had an overall basis weight of 65 gsm. The fabric was then dried at 400° F. for 10–15 seconds. Added to the fabric was 204 weight percent, based on the dry weight of the fabric, of an aqueous solution having 100 ppm divalent calcium ions.

As determined according to the procedure of Comparative Example 2, the tensile strength of the saturated fabric was 430 grams per 76 millimeters of width. The fabric was stable in the test solution but dispersed in water in less than one hour.

Those skilled in the art will appreciate that various substitutions, omissions, changes and modifications may be made without departing from the spirit of the invention or scope of the appended claims. Accordingly, it is intended that the foregoing description be deemed merely exemplary of the preferred scope of the present invention and not be deemed a limitation thereof.

What is claimed is:

1. A nonwoven fabric comprising fibrous material and a water-soluble binder composition, wherein the binder composition comprises from about 25 weight percent about 85 weight percent of an unsaturated carboxylic acid/unsaturated carboxylic acid ester terpolymer and from about 15 weight percent to about 75 weight percent of a hydrophilic cross-linkable polymer wherein the hydrophilic crosslinkable polymer is selected from the group consisting of poly(ethylene-vinyl acetate) with N-substituted acrylamide, acrylamide, N-substituted acrylamide based copolymers with a cross-linkable monomer, copolyacrylates, poly (ethylene vinyl alcohol) having less than about 3 percent hydrolysis, poly(ethylene glycol) grafted onto a polyolefin so that the poly(ethylene glycol) moieties can be cross-linked, poly(ethylene-vinyl acetate) with N-methylol acrylamide, N-methylol acrylamide, copolymer hydroxy ethyl methacrylate with methyl methacrylate, copolymer hydroxy ethyl methacrylate with methyl acrylate, copolymer poly(ethylene glycol) methacrylate with methyl methacrylate, and copolymer poly(ethylene glycol)-methacrylate with methyl acrylate; and, wherein the nonwoven fabric is water-dispersible in an aqueous environment having a divalent ion concentration of up to about 50 ppm and a monovalent ion concentration of up to about 0.4 weight percent.

2. The nonwoven fabric of claim 1, wherein the binder composition comprises from about 40 weight percent to about 75 weight percent of the unsaturated carboxylic acid/unsaturated carboxylic acid ester terpolymer and from about 25 weight percent to about 60 weight percent of the hydrophilic cross-linkable polymer.

3. The nonwoven fabric of claim 1, wherein the binder composition further comprises from about 5 weight percent to about 35 weight percent of a divalent ion inhibitor.

4. The nonwoven fabric of claim 3, wherein the binder composition comprises from about 40 weight percent to about 75 weight percent of the unsaturated carboxylic acid/unsaturated carboxylic acid esters terpolymer; from about 5 weight percent to about 20 weight percent of the divalent ion inhibitor; and from about 10 weight percent to about 50 weight percent of the hydrophilic cross-linkable polymer.

5. The nonwoven fabric of claim 1, wherein the unsaturated carboxylic acid/unsaturated carboxylic acid ester terpolymer comprises from about 10 weight percent to about 90 weight percent of at least one of acrylic acid and methacrylic acid; and from about 90 weight percent to about 10 weight percent of at least one of acrylic esters and methacrylic esters having an alkyl group of 1 to 18 carbon atoms or a cycloalkyl group of 3 to 18 carbon atoms in which 2 to 60 mole percent of the repeating units are derived from at least one of acrylic acid and methacrylic acid in the form of a salt.

6. The nonwoven fabric of claim 3, wherein the divalent ion inhibitor is selected from the group consisting of sulfonated copolyester, polyphosphate, phosphonic acid, aminocarboxylic acid, hydroxycarboxylic acid, polyamine and cross-linkable poly(ethylene-vinyl acetate).

7. The nonwoven fabric of claim 6, wherein the divalent ion inhibitor is a sulfonated copolyester.

8. The nonwoven fabric of claim 1, wherein the fibrous material comprises fibers selected from the group consisting of natural and synthetic fibers.

9. A wipe comprising the nonwoven fabric of claim 1, and a wetting agent.

10. The wipe of claim 9, wherein the binder composition further comprises from about 5 weight percent to about 35 weight percent of a divalent ion inhibitor.

11. The wipe of claim 10, wherein the divalent ion inhibitor is selected from the group consisting of sulfonated copolyester, polyphosphate, phosphonic acid, aminocarboxylic acid, hydroxycarboxylic acid, polyamine and cross-linkable poly(ethylene-vinyl acetate).

12. The wipe of claim 11, wherein the divalent ion inhibitor is a sulfonated copolyester.

13. The wipe of claim 9, wherein the binder composition comprises from about 40 weight percent to about 75 weight percent of the unsaturated carboxylic acid/unsaturated carboxylic acid esters terpolymer; from about 5 weight percent to about 20 weight percent of the divalent ion inhibitor; and from about 10 weight percent to about 50 weight percent of the hydrophilic cross-linkable polymer.

14. The wipe of claim 9, wherein the unsaturated carboxylic acid/unsaturated carboxylic acid ester terpolymer comprises from about 10 weight percent to about 90 weight percent of at least one of acrylic acid and methacrylic acid; and from about 90 weight percent to about 10 weight percent of at least one of acrylic esters and methacrylic esters having an alkyl group of 1 to 18 carbon atoms or a cycloalkyl group of 3 to 18 carbon atoms in which 2 to 60 mole percent of the repeating units are derived from at least one of acrylic acid and methacrylic acid in the form of a salt.

15. The wipe of claim 9, wherein the fibrous material comprises wood pulp fibers.

16. A package of pre-moistened wipes comprising two or more wipes of claim 9.

* * * * *